(12) United States Patent
Mirra et al.

(10) Patent No.: US 10,128,938 B2
(45) Date of Patent: Nov. 13, 2018

(54) HIERARCHICAL LINK QUALITY METRICS FOR A BEAM IN A SATELLITE NETWORK

(71) Applicant: HUGHES NETWORK SYSTEMS. LLC, Germantown, MD (US)

(72) Inventors: Steven Dominic Mirra, Germantown, MD (US); James Jehong Jong, Germantown, MD (US); Bhanu Durvasula, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 101 days.

(21) Appl. No.: 15/393,941

(22) Filed: Dec. 29, 2016

(65) Prior Publication Data

US 2018/0191426 A1   Jul. 5, 2018

(51) Int. Cl.
*H04B 7/185* (2006.01)
*H04W 28/08* (2009.01)
*H04W 72/04* (2009.01)
*H04W 72/08* (2009.01)

(52) U.S. Cl.
CPC ..... *H04B 7/18519* (2013.01); *H04B 7/18582* (2013.01); *H04B 7/18584* (2013.01); *H04W 28/08* (2013.01); *H04W 72/046* (2013.01); *H04W 72/085* (2013.01)

(58) Field of Classification Search
CPC ............ H04B 7/18519; H04B 7/18582; H04B 7/18584; H04W 28/08; H04W 73/046; H04W 73/085
See application file for complete search history.

(56) References Cited

U.S. PATENT DOCUMENTS

2010/0087152 A1* 4/2010 Mourad ............ H04B 17/0085
                                                          455/67.11
2016/0381570 A1* 12/2016 Lysejko ................. F16M 11/06
                                                          455/562.1

* cited by examiner

*Primary Examiner* — Habte Mered
(74) *Attorney, Agent, or Firm* — Nath, Goldberg & Meyer; Leonid D. Thenor

(57) ABSTRACT

A system and method for determining hierarchical link quality metrics in a communication system, and performing different routines to optimize operation of the communication system based on the link quality metrics. Data is collected for a predetermined interval, and a carrier link quality is determined for each terminal utilizing different carriers in the communication system. A link quality is determined for each terminal type, and a beam link quality is determined for each beam in the system. Different thresholds are set so that optimization routines can be performed based on the current link quality values.

20 Claims, 11 Drawing Sheets

HIERARCHICAL LINK QUALITY METRICS FOR A BEAM IN A SATELLITE NETWORK

BACKGROUND INFORMATION

Modern communication systems allow consumers to maintain connectivity, regardless of their location. Many consumers are capable of utilizing different types of terminals (e.g., mobile phones, satellite phones, etc.) while traveling or moving through different geographic locations. Satellite communication systems are at least one type of communication system which facilitate such mobility to consumers. As the number of consumers and desired content increases, it also becomes necessary to monitor system status in order to maintain appropriate quality of service.

Communication systems, such as satellite communication systems, are extremely complicated and incorporate a large number of subsystems which must be properly integrated for proper functionality. Such systems can include multiple beams and multiple terminals operating within the beams. The system typically provides individual link quality metrics for each terminal, including energy per symbol to noise power spectral density ratio ($E_s/N_o$) and transmit power. In order to quickly assess overall system status, it is necessary to obtain, observe, and analyze various operational metrics associated with key systems and subsystems.

Conventional system monitoring typically requires data collection from various systems/terminals and off-line analysis thereof. Oftentimes, however, results of the data analysis are obtained after certain problems have persisted over extended periods of time. Furthermore, the communication system may experience intermittent and/or temporal complications that occur at various points during the day. Although such complications can severely affect the overall system functionality, they cannot be easily observed and/or addressed through offline analysis. Furthermore, such complications can affect subscriber communication and result in dissatisfaction.

While a system operator can examine the link quality metrics of components such as individual terminals, it is useful to obtain and examine beam metrics which encompass more than one terminal in a beam. These beam metrics can be hierarchical in nature, and range from a metric which comprises all terminals of one type on a single carrier in a beam, to a metric which comprises all terminals of different types in a beam. Such metrics can be used to assess link quality in a beam in real-time, and dynamically modify various parameters to improve and/or optimize system performance.

BRIEF SUMMARY

A system and method are described for determining hierarchical link quality metrics in a communication system, and performing different optimizations based on the link quality metrics. According to an embodiment, the method includes: collecting data, for a predetermined interval, in a communication system having at least one beam and a plurality of carriers operable within each of the at least one beam; determining a carrier link quality for each terminal type on each of the plurality of carriers utilized in the communication system; determining a mean carrier link quality and standard deviation of the carrier link quality for each terminal type based, at least in part, on the determined carrier link qualities; determining a terminal type link quality for each terminal type on the plurality of carriers, based on the mean carrier link qualities and standard deviation of the carrier link qualities; generating a beam link quality for each of the at least one beam based, at least in part, on the terminal type link qualities; and performing at least one optimization routine responsive to the beam link quality.

According to another embodiment, the system includes: a plurality of terminal of predetermined types for communicating over a communication system having at least one beam and a plurality of carriers operable within each of the at least one beams; and at least one base station configured to communicate with the plurality of terminal types, and to monitor and control one or more operations within the communication system. The at least one base station being further configured to: collect data, for a predetermined interval, determine a carrier link quality for each terminal type on each of the plurality of carriers utilized in the communication system, determine a mean carrier link quality and standard deviation of the carrier link quality for each terminal type based, at least in part, on the determined carrier link qualities, determine a terminal type link quality for each terminal type on the plurality of carriers, based on the mean carrier link qualities and standard deviation of the carrier link qualities, generate a beam link quality for each of the at least one beam based, at least in part, on the terminal type link qualities, and perform at least one optimization routine responsive to the beam link quality.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A system and method are described for determining hierarchical link quality metrics in a communication system, and performing different optimizations based on the link quality metrics. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
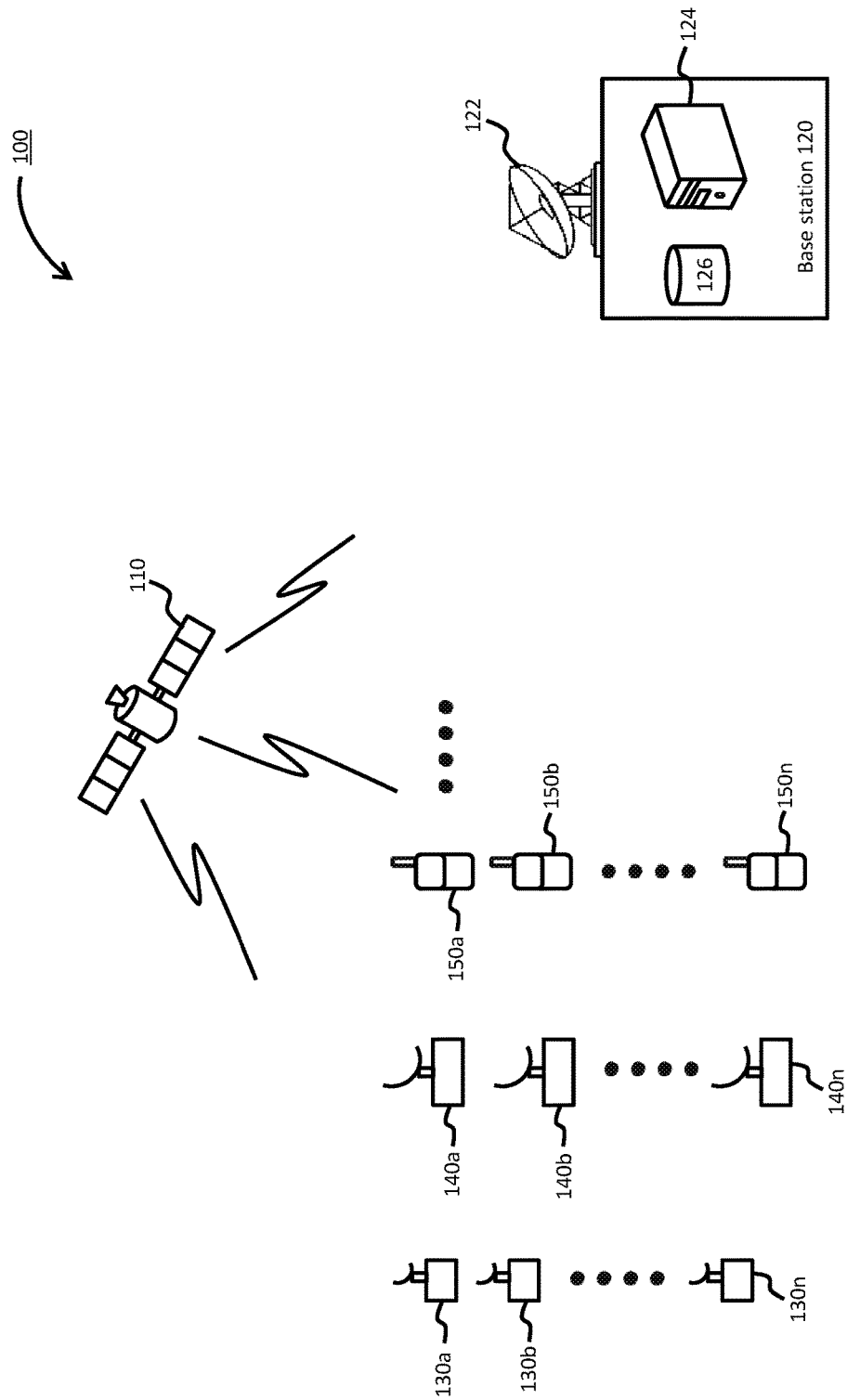
FIG. 1 is a diagram of a system capable of monitoring operational functions in a satellite communication system and improving performance, according to one embodiment.

FIG. 1 is a block diagram illustrating a system 100 for monitoring operational functions in a satellite communication system and improving performance, according to at least one embodiment. The system 100 includes a satellite 110 and base station 120 which facilitate communication between various types of terminals. For example, the system 100 a plurality of type_1 terminals 130a-130n, type_2 terminals 140a-140n, and type_3 terminals 150a-150n. The type_1 terminals 130a-130n can be in the form of a units having small fixed (or directional) antenna. The type_2 terminals 140a-140n can be in the form of units having a medium fixed antenna. In contrast, the type_3 terminals 150a-150n can be in the form of mobile devices having omnidirectional antennas.

The base station 120 and terminals (130, 140, 150) communicate with each other through multiple beams, where the base station 120 transmits signals to terminals (130, 140, 150) in the forward link direction, and the terminals (130, 140, 150) transmit signals to the base station 120 in the return link direction. Each beam carries one or more carriers, and multiple terminals (130, 140, 150) may operate on each carrier. As used herein, the term "carrier" corresponds to a contiguous span of spectrum in which bursts are transmitted to/from the terminals (130, 140, 150). Contiguous allocated spectrum is used primarily to transmit bursts on carriers which occupy the entire allocated spectrum. Bursts on smaller carriers which don't occupy the entire allocated spectrum, however, may also be transmitted. Although FIG. 1 only illustrates three different terminal types and one base station, it should be noted that different systems can include additional terminal types and base stations. For example, additional base stations additional may be provided at different points within the system 100. Thus, the use of three terminal types and one base station should only be considered as illustrative and not restrictive.

In order to exchange information with the terminals (130, 140, 150), the base station 120 can include a transceiver 122 which transmits/receives information to/from the satellite 110. The terminals (130, 140, 150) can communicate with the base station 120 along a bent pipe path facilitated by the satellite 110. According to at least one embodiment, the base station 120 can include a processing unit 124 (or computer, CPU, etc.), and a data storage unit 126. Alternatively, the base station 120 can include multiple processing units 124 and multiple data storage units 126 in order to accommodate the needs of a particular system implementation. The data storage units 126 can be used to store and provide various access to information pertaining, in part, to operations in the satellite communication system 100. The processing unit 124 can be configured, in part, to perform various tasks related to the link quality associated with the terminals (130, 140, 150). For example, the processing unit 124 can be configured to establish different time periods for monitoring terminal activity, determining if system performance has degraded, and performing various functions to dynamically improve performance.

Figure 2:
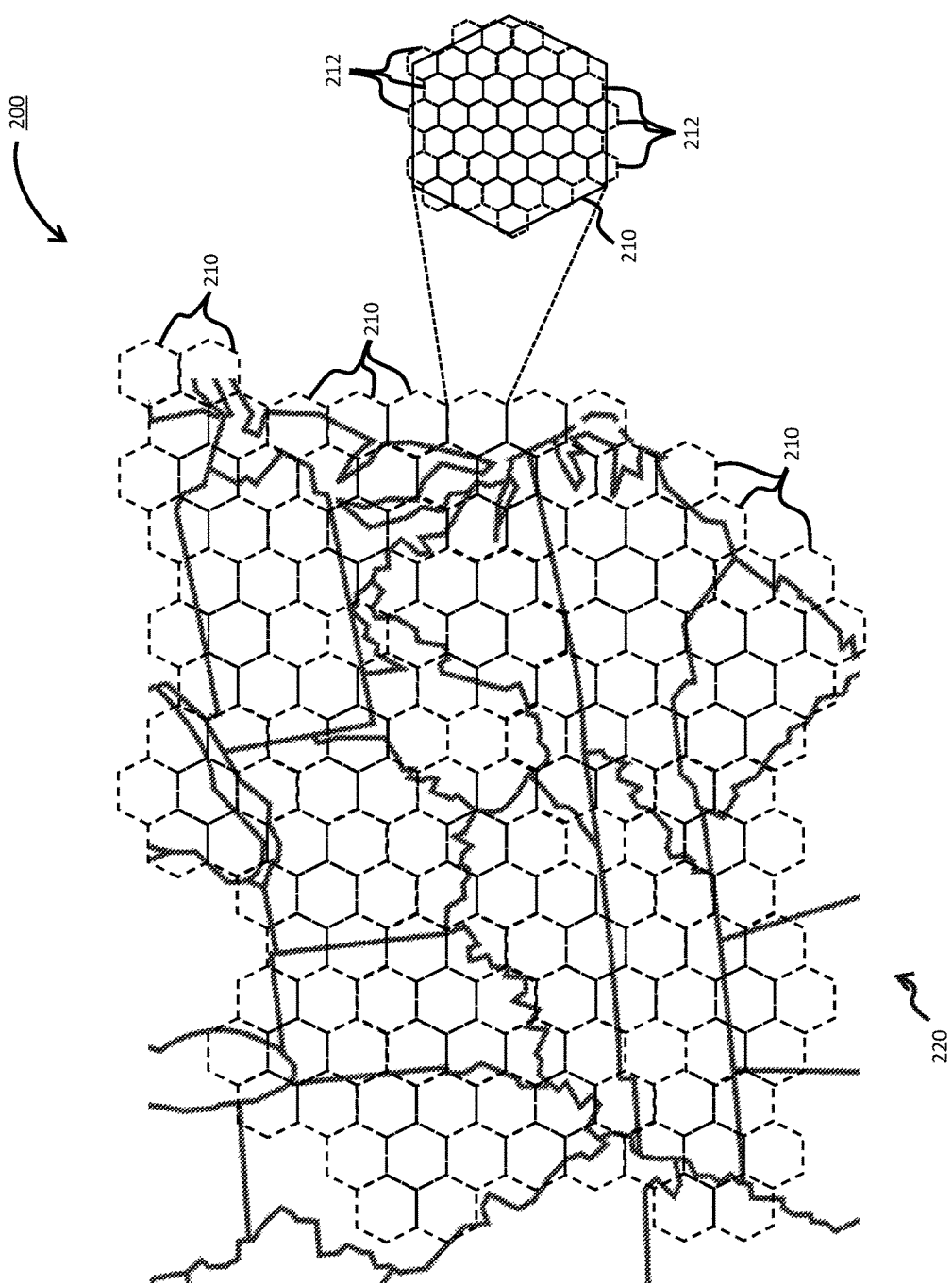
FIG. 2 is a diagram of an exemplary display that can be used for monitoring operations in the system of FIG. 1, according to one embodiment.

FIG. 2 illustrates an exemplary display 200 for monitoring and controlling operations in the satellite communication system, according to an embodiment. As illustrated in FIG. 2, the display 200 includes a layout of a map portion 220 which represents a portion of the satellite coverage area. Depending on the specific implementation, the map 220 can be configured to include various topography features of the coverage area, as well as other geographical information such as, for example, city, state, etc. A plurality of coverage beams 210 are overlaid on the map 210 to represent the satellite coverage area. Each beam 210 represents, for example, a specific coverage portion within the satellite coverage area. Thus, by incorporating all of the beams 210 over the map 210, a representation of the satellite coverage area can be displayed for the operator. Geographical information pertaining to the map 210 can be obtained from various sources, including but not limited to, open source repositories, proprietary systems, etc. Additionally, information pertaining to the size and location of individual beams 210 can be obtained, for example, from the base station 120 or various subsystems within the satellite communication system 100.

According to various embodiments, the individual beams 210 can incorporate colors (or visual indicators) that provide status information for any particular beam 210. For example, the beams 210 can be configured to provide information corresponding to link quality metrics determined for the beam, carriers, and terminal types. According to an embodiment, the link quality metrics can be configured such that higher values are indicative of higher quality links, and lower values are conversely interpreted as lower quality links. Thus, depending on the color applied to each individual beam 210, an operator can interpret the real time link quality metrics within the satellite coverage area. For example, the link quality metrics can change based on optimization and/or corrective steps performed in response to monitoring communication over different time intervals.

According to at least one embodiment, an assigned number for each beam 210 can be displayed in the center of the corresponding beam 210. Alternatively, the assigned number can be displayed together with other information (e.g., carrier link quality value, terminal type link quality value, beam link quality value, etc.) upon selecting and/or hovering a selection cursor over a specific beam 210. According to the illustrated embodiment, each beam 212 can be further composed of multiple micro beams 212. By utilizing a zoom function, for example, the map display 220 can be enlarged so that the micro beams 212 can be displayed within each beam 210. Furthermore, information pertaining to the individual micro beams 212 can be obtained by selecting a specific micro beam 212.

Figure 3A:
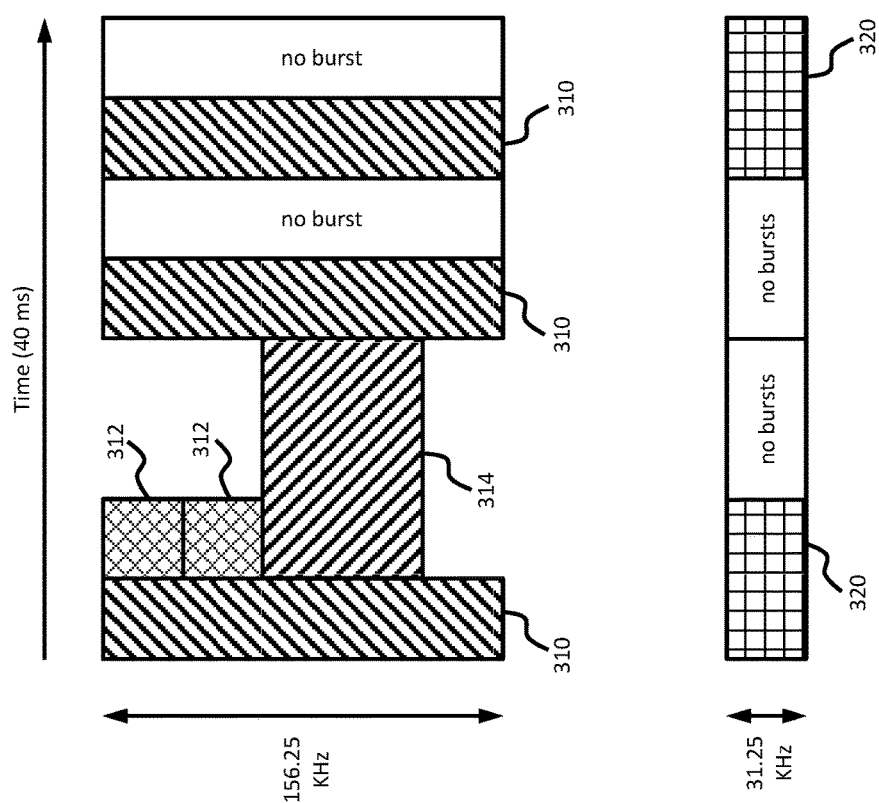
FIG. 3A is a diagram illustrating data collection over a return link, according to one embodiment.

FIG. 3A illustrates data collection over a return link, in accordance with at least one embodiment. FIG. 3A illustrates a beam which has 31.250 KHz of spectrum allocated for one carrier and 156.25 KHz of spectrum allocated for a second carrier. Furthermore, the carrier which occupies 31.250 KHz of spectrum can be referred to as a "1×" carrier, and the carrier which occupies 156.25 KHz of spectrum (or five times the spectrum of the "1×" carrier) can be referred to as a "5×" carrier. According to the illustrated example, the system supports transmission of bursts on 1×, 2×, or 5× carriers, i.e., bursts occupying 31.25 KHz, 62.5 KHz, or 156.25 KHz of spectrum respectively. FIG. 3A illustrates bursts transmitted by different terminals over a 40 ms interval using different 5 ms time slots. Furthermore, bursts on smaller carriers can be transmitted within the 5× (or 156.25 KHz) spectrum, although it is primarily used to carry 5× bursts. During the 40 ms interval, a 5× burst 310 occupying the entire 156.25 KHz spectrum is transmitted during the first time slot, fifth time slot, and seventh time slot. A 2× burst 314 occupying 62.5 KHz of spectrum and spanning three time slots (or 15 ms) is transmitted during the second to fourth time slots. Furthermore, two 1× bursts 312 occupying 31.25 KHz of spectrum are simultaneously transmitted during the second time slot. During the same 40 ms interval, the 1× carrier carries a 1× burst 320 occupying 31.25 KHz of spectrum and spanning the first and second time slots, and another 1× burst 320 spanning the seventh and eighth time slots. The data collection illustrated in FIG. 3A is performed for all terminals in the system over the return link.

According to one or more embodiments, a carrier weight $\beta_l^k(n)$ is determined for the return link direction, where:
n is the carrier number,
l is the terminal type, and
k is the beam number.

The carrier weight is applied to metrics computed for the n-th carrier in the beam, and proportional to the time over which the carrier is active. In the return link, the time unit used to calculate $\beta_l^k(n)$ is the time span corresponding to the shortest burst used in the system (i.e., 5 ms). Thus, over the time period shown in FIG. 3A, $\beta_l^k(n)$ is computed to be 6 for the 5× carrier. More particularly, bursts are received in six of the eight 5 ms time slots shown for the 5× carrier during the 40 ms time interval. The carrier weight ($\beta_l^k(n)$) for the 1× carrier is computed to be 4, because bursts are received in four of the eight 5 ms time slots in the same 40 ms interval.

Values for the average carrier link quality $\varphi_l^k(n)$, and carrier standard deviation $\psi_l^k(n)$ are determined for each carrier by obtaining average and standard deviation of the burst link quality metric computed for each burst received on a carrier from a given terminal type by the base station. This burst link quality metric, $\zeta_l^k(n)$, is given by:

$$\zeta_l^k(n) \text{ (dB)} = \text{PBO (dB)} + E_S/N_0 \text{ (dB)} + BW/BW_{min} \text{ (dB)}$$

where:
PBO (or Power Back-Off)=transmit power of the burst expressed as the back-off from a terminal maximum power
$E_S/N_0$=Burst $E_S/N_0$
BW=Occupied Bandwidth of the burst
$BW_{min}$=Smallest Burst Bandwidth in the System According to the embodiment illustrated in FIG. 3A, the smallest burst bandwidth, in the system is $BW_{min}$=31.25 kHz. Next, a running summation of the burst link quality of the received bursts is maintained during a designated time period (e.g., 15 minutes). The running summation can be updated as follows:

Update linear sum as $S=S+\zeta_l^k(n)$

Update square sum as $V=V+\zeta_l^k(n)\cdot\zeta_l^k(n)$

Increment number of received burst as $M=M+1$

The initial values of S, V, and M are set=0, and the average carrier link quality $\varphi_l^k(n)$, and the carrier standard deviation $\psi_l^k(n)$ are respectively determined as:

$$\varphi_l^k(n) = \frac{S}{M} \text{ and } \psi_l^k(n) = \sqrt{\frac{V}{M} - \left(\frac{S}{M}\right)^2}$$

Figure 3B:
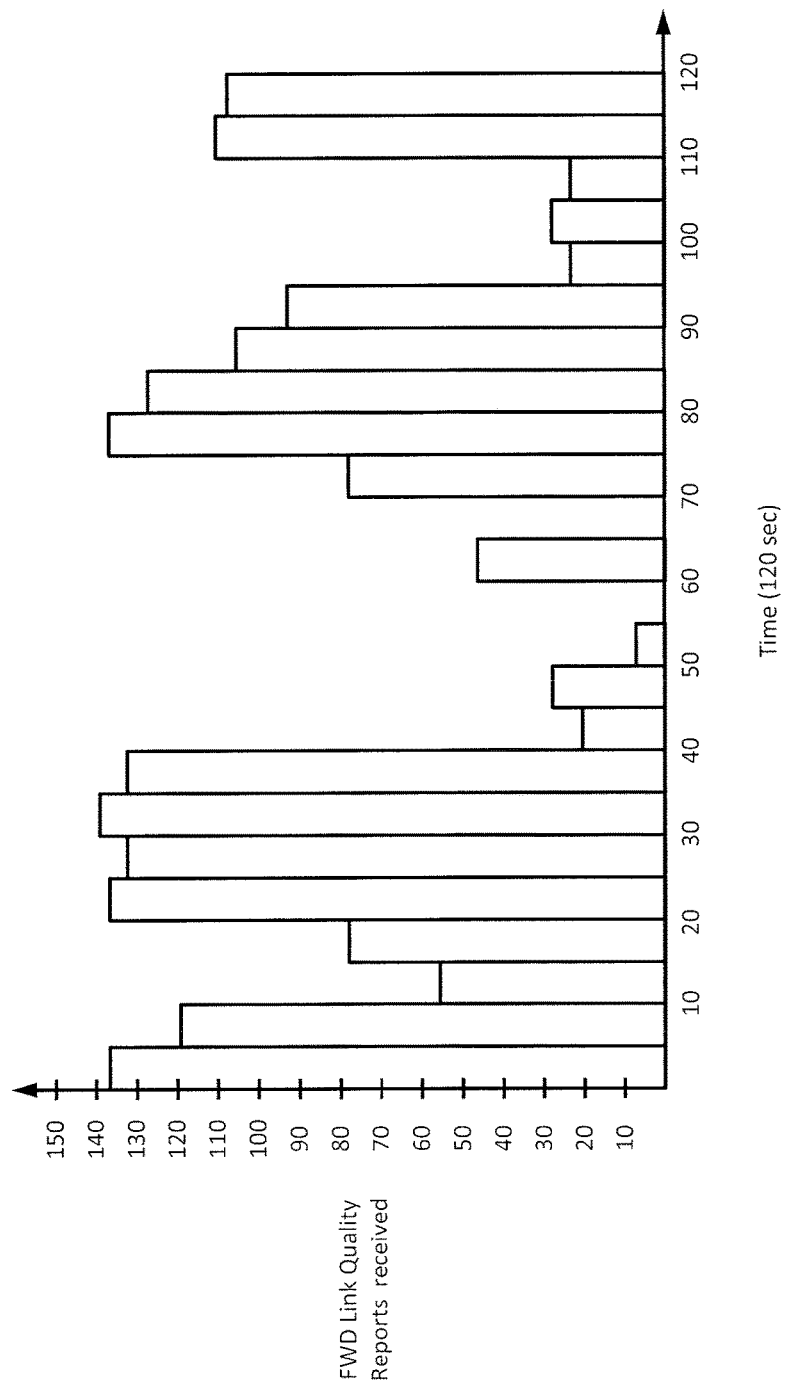
FIG. 3B is a diagram for illustrating data collection over a forward link, according to another embodiment.

FIG. 3B is a diagram illustrating collection data over a forward link, in accordance with at least one embodiment. Unlike the return link where the base station is capable of performing various measurements to determine properties of transmissions from different terminal types, such information must be determined at the individual terminals. Thus, according to the illustrated embodiment, each terminal prepares a forward link quality report that is transmitted to the base station periodically. Using this information, the base station is capable of assessing the burst link quality of individual terminals and terminal types in the system. According to one embodiment, for example, a predetermined time period can be set, during which the base station tracks the number of forward link quality reports received from each terminal. Depending on the specific system, the terminals may be operating within a single beam, or multiple beams. Furthermore, different terminal types can utilize different carriers for transmitting information.

As illustrated in FIG. 3B, a measurement period of 120 seconds has been selected for receiving forward link quality reports. Furthermore, the measurement period is broken into five second (5 s) intervals during which the total number of forward link quality reports are accumulated. Thus, every five seconds, the base station resets the count of forward link quality reports that have been received. The process continues over the entire measurement period of 120 seconds. The result is a series of five second measurements containing the number of forward link quality reports received from each terminal.

Since the reports are received in real-time, they effectively mimic the level of activity within the system on the forward link for the selected beam. For example, FIG. 3B shows that nearly 140 reports are received during the first five second interval, and nearly 120 reports are received during the second measurement interval. During the third measurement interval, however, less than 60 reports are received. During the time period spanning from 20 to 40 seconds, each measurement interval show a count of over 130 forward link quality reports being received. The number of reports received then decreases between the period spanning from 40 to 55 seconds. During the measurement intervals between 55 and 60 seconds and during 65 and 70 seconds no forward link quality reports are received from the terminals.

Once all the forward link quality reports have been received for the measurement period, the base station determines weights to be applied, for example, when obtaining the mean link quality values. According to an embodiment, if link quality reports from a particular terminal type on a first carrier are received for 50 seconds of the measurement interval shown in FIG. 3B (i.e., 0-120 seconds), then the weight for the first carrier would be 50. If link quality reports from the same terminal type on a second carrier are received for 70 seconds of this measurement interval, then the weight for the second carrier would be 70. Next, the base station determines which terminal transmitted each report as well as the terminal type from which the report is received. As previously discussed, the system can include various different types of terminals such as, for example, handheld mobile terminals having omni-directional antennas, fixed terminals having small directional antennas, fixed terminals having medium directional antennas, etc. The base station groups the forward link quality reports in accordance with each terminal type as well as each carrier that is used by the terminal type. Reports received from terminal type_1, for example, would be subsequently subdivided into the specific carrier that is used for transmission.

According to one or more embodiments, reports received from terminal type_1 can be further subdivided based on each beam within the system. For example, beam_1 can include multiple terminal types which would send reports pertaining to the carriers on which they are operating. Beam number 2, however, may only support one terminal type during the measurement period, and therefore would only contain reports from one terminal type for each carrier that is used. A burst link quality is subsequently determined for each carrier as follows:

$\zeta_l^k(n)$ (dB)=$E_S/N_0$ (dB)+$P_{ref}/P$ (dB)+BW/BW$_{min}$ (dB)+$G_{l,adj}^k$ (dB)

where:
P=forward carrier transmit power
P$_{ref}$=forward carrier reference transmit power, or lowest transmit power used for the smallest carrier in the system
$E_S/N_0$=forward link $E_S/N_0$ reported by the terminal
BW=Occupied Bandwidth of the burst
BW$_{min}$=Smallest Burst Bandwidth in the System
$G_{l,adj}^k$=term used to eliminate differences between beams due to varying gains applied to carriers in each beam A running summation of the burst link quality reported from the terminals is maintained during a designated time period (e.g., 15 minutes). The running summation can be updated as follows:

Update linear sum as $S=S+\zeta_l^k(n)$

Update square sum as $V=V+\zeta_l^k(n)\cdot\zeta_l^k(n)$

Increment number of received link quality reports as $M=M+1$

The initial values of S, V, and M are set=0, and the average carrier link quality $\varphi_l^k(n)$, and the carrier standard deviation $\psi_l^k(n)$ are respectively determined as:

$$\varphi_l^k(n) = \frac{S}{M} \text{ and } \psi_l^k(n) = \sqrt{\frac{V}{M} - \left(\frac{S}{M}\right)^2}$$

Figure 4A:
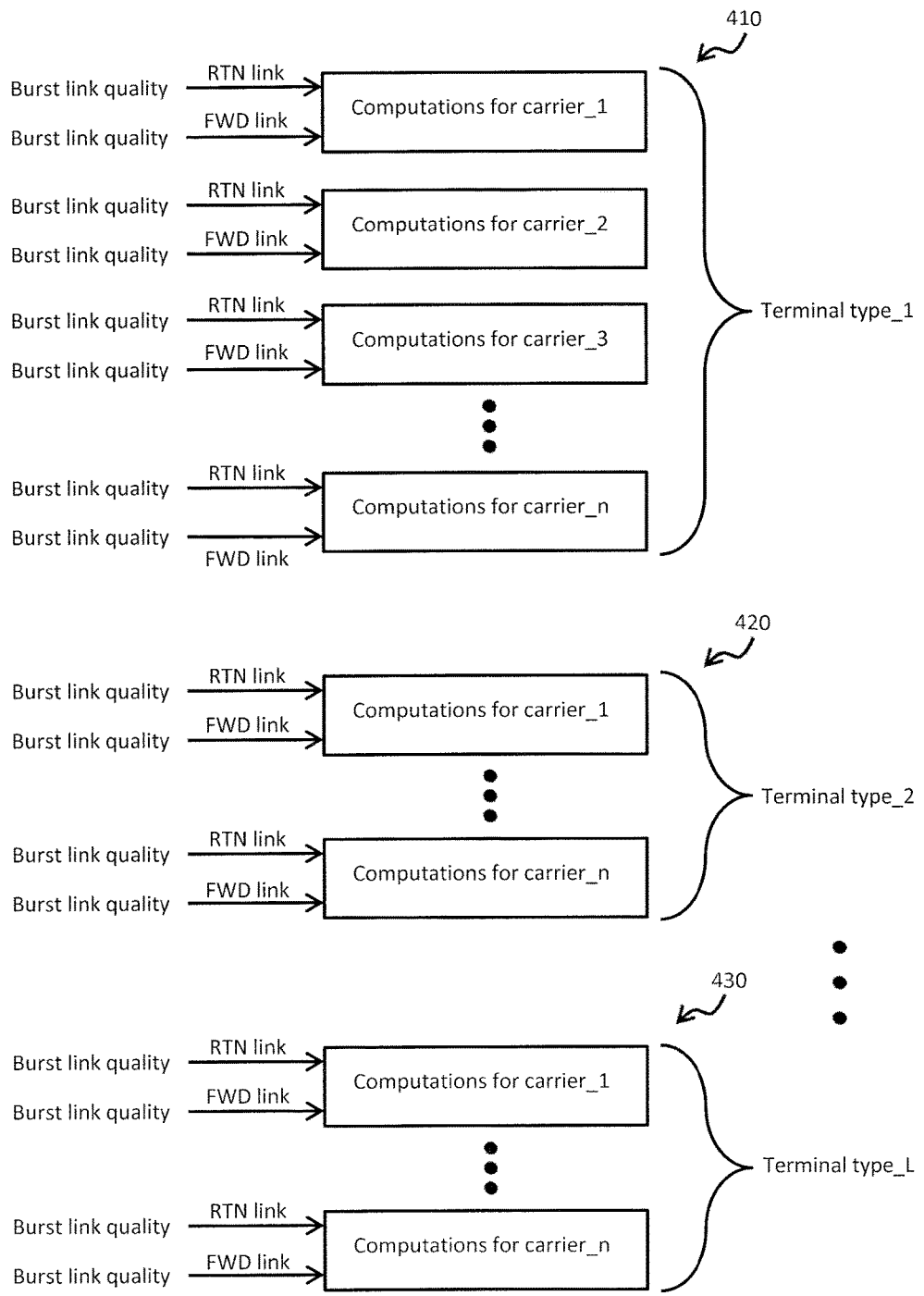
FIG. 4A is a diagram for illustrating details of link quality metrics that are generated for each terminal type, according to one or more embodiments.

FIG. 4A illustrates details of link quality metrics that are generated for each terminal type based on the burst link quality computed from both the forward link and the return link for each terminal. As previously discussed, the base station collects burst information for each terminal on the return link, and receives forward link quality reports from each terminal on the forward link. The burst link quality for each burst and each forward link quality report received on a carrier are used to determine metrics for the link quality of the different terminal types. For example, such metrics are used to perform carrier level calculations that result in terminal type link quality for terminal type_1 at 410, terminal type_2 at 420, and terminal type_L (last terminal type) at 430.

According to an embodiment, the mean link quality of the l-th terminal type in the k-th beam is given by:

$$u_l^k = \frac{\sum_n \beta_l^k(n)\varphi_l^k(n)}{\sum_n \beta_l^k(n)},$$

where:
the summation is over the number of carriers that are used by the terminals belonging to the l-th terminal type,
$\varphi_l^k(n)$ denotes the average carrier link quality of the n-th carrier computed for the l-th terminal type in the k-th beam,
$\beta_l^k(n)$ is the weight applied to the n-th carrier and is proportional to the time over which the carrier is active.

Similarly, the standard deviation of the link quality of the l-th terminal type in the k-th beam is given by:

$$\sigma_l^k = \frac{\sum_n \beta_l^k(n)\psi_l^k(n)}{\sum_n \beta_l^k(n)}$$

where $\psi_l^k(n)$ denotes the standard deviation of n-th carrier link quality computed for the l-th terminal type in the k-th beam. As previously discussed, the values for $\beta_l^k(n)$, $\varphi_l^k(n)$, and $\psi_l^k(n)$ are determined based on data collected from received bursts and forward link quality reports.

The terminal type link quality for the l-th terminal type is then determined as:

$$\phi^k(l) = \frac{1}{c_l^k} \cdot \frac{u_l^k}{\sigma_l^k} \cdot \frac{1}{\phi_l^k[ref]} \quad 0 \le c_l^k \le 3$$

which is typically expressed in (dB) as:

$\phi_l^k$ dB=$u_l^k$ dB-$c_l^k\cdot\sigma_l^k$ dB-$\phi_l^k$[ref] dB $0\le c_l^k\le 3$ Where $\phi_l^k$[ref], denotes the highest, normalized target $E_s/N_o$ that the l-th terminal type supports in the k-th beam, as configured in the system. According to various embodiments, the term $\phi_l^k$[ref] allows for assessment of the margin referenced to the highest (normalized) $E_s/N_o$ target used by the given terminal type in the given beam. As can be appreciated, the beam gains could differ widely over different geographical areas in the satellite footprint. The ability to adjust target $E_s/N_o$ (i.e., $\phi_l^k$[ref]) for different terminal types as well as for different beams, enables the system to perform more fair and accurate assessments of the link condition of the beam.

Figure 4B:
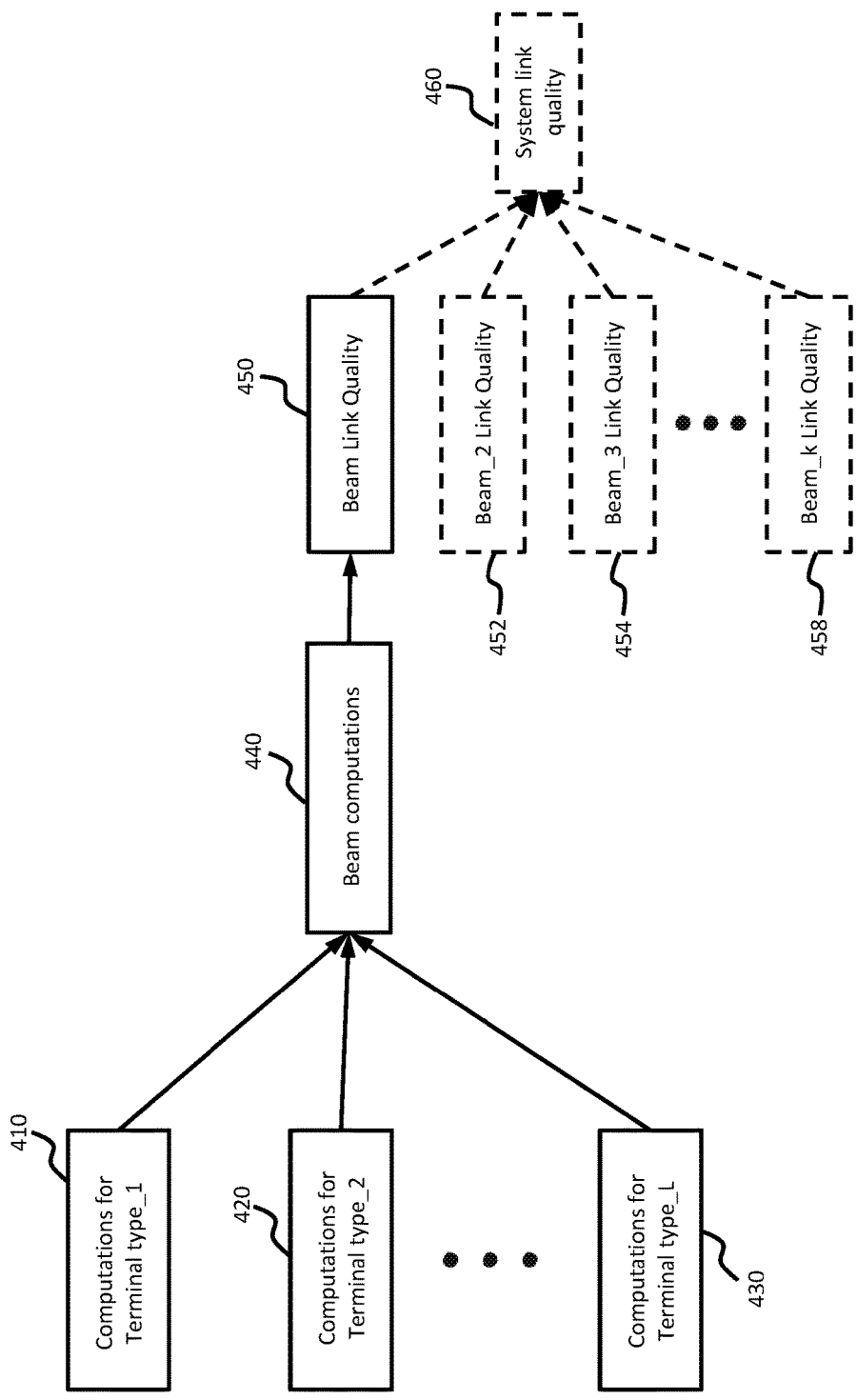
FIG. 4B is a diagram for illustrating details of link quality metrics that are generated for each beam, according to at least one embodiment.

FIG. 4B illustrates details of link quality metrics that are generated for each beam based on the terminal type link qualities determined in FIG. 4A. According to the illustrated embodiment, the beam link quality is computed based, in part, on the link quality for each terminal type. For example, the link qualities for terminal type_1 410, terminal type_2 420, etc. are combined at 440 in order to obtain a beam link quality (450) indicative of the overall performance of terminals supported by the beam.

According to at least one embodiment, the beam link quality can be determined per direction (i.e., forward link or return link), based on the link quality of each different terminal type. According to other embodiments, the beam link quality can be determined based on both directions. The link quality for a given beam (k) can be determined as:

$$LQM^k = \frac{\sum_l w^k(l)\phi^k(l)}{\sum_l w^k(l)}$$

where:
summation is over the terminal type l,
$w^k(l)$ is the weight applied to terminal type l in k-th beam
$\phi^k(l)$ is the link metric of terminal type l in k-th beam The terminal weights, $w^k(l)$, allows flexibility in distinguishing different terminal types from each other. For example, consider a beam containing semi-fixed terminals (with large antennas) and multiple handheld terminal types. It may not be very meaningful to combine the link quality values for the semi-fixed terminal type with the link quality values from the handheld terminal types because the link conditions as well as the link closure capabilities of these terminal types could differ so widely. According to an embodiment, the link quality for the semi-fixed terminal type can be determined independently by setting its weight to 1 and setting the weight of the handheld terminal types to 0. The handheld terminal types in the beam, however, are similar enough that a single link quality value can be determined for all handheld terminal types. The link quality for all handheld terminal types in the beam can be determined by setting equal weights for each of the handheld terminal types and setting the weight value to 0 for the semi-fixed terminal type.

The terminal weights can further be time-based, and determined in a manner similar to the time-based weights used for carriers. For example, consider weigh values for two terminal types that are assessed over a particular measurement interval (e.g., 0-60 minutes). Terminal type_1 is assessed over a 10 minute period (within measurement interval), and terminal type_2 is assessed over a 1 minute period within the same interval. It may not be advantageous to weight each value the same, even if the terminal types themselves are nearly the same and can otherwise be treated with the same weight in all other respects. According to an embodiment, two different carriers can be used to obtain the weight for each terminal type. For example, carrier_1 can be used and assessed over time period 0-15 minutes, and carrier_2 can be used and assessed over time period 30-40 minutes. The total time-based weight for the selected terminal type would be 25. If carrier_1 is used and assessed over time period 0-15 minutes and carrier_2 is also used and assessed over time period 0-15 minutes, the total time-based weight for the selected terminal type would be 15, because this terminal type was assessed over only 15 minutes of the entire measurement interval. While the foregoing examples have utilized two different carriers, it should be noted that additional carriers (including all active carriers) can be used in determining the time-based weights.

According to the embodiment illustrated in FIG. 4B, a link quality can be determined for each individual beam in the system. This can be done for each beam along forward link direction, the return link direction, or both. The link quality for each beam can subsequently be combined in order to determine an overall link quality for the entire system (i.e., a system link quality). For example, a link quality can be determined for a second beam (Beam_2) can be determined at 452. A link quality can be similarly determined for a third beam at 454. Link qualities can be determined for all additional beams up to the last beam at 458. The link qualities of all beams in the system can be subsequently combined to obtain a system link quality at 460.

Figure 5:
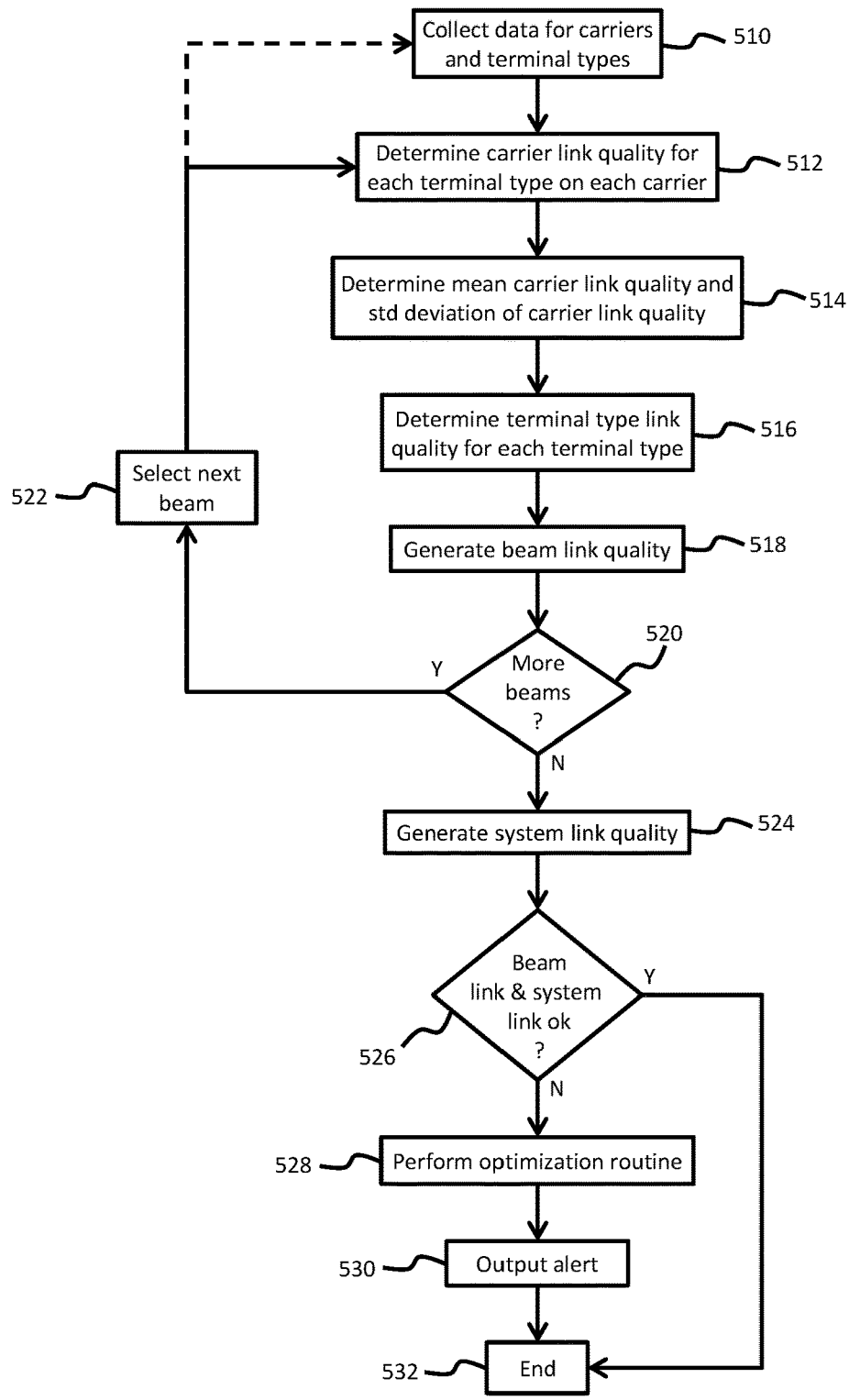
FIG. 5 is a flowchart of a process for optimizing a system based on different link qualities, according to one embodiment.

FIG. 5 is a flowchart illustrating various steps performed in optimizing a system based on the different link qualities, in accordance with one or more embodiments. At 510, data is collected for the carriers and terminal types within the beam. For example, data would be collected for all terminals that are active during a predetermined measurement period along all operable carriers. The data collected is subsequently categorized by terminal type and specific carriers used by each terminal type to transmit during the measurement period. At 512, a carrier link quality is determined for each terminal type on each carrier. For example, if the system contains 2 terminal types and 3 carriers, then a carrier link quality would be determined for terminal type_1 on carrier_1, carrier_2, and carrier_3. Similarly, carrier link quality reports would be determined for terminal type_2 on carrier_1, carrier_2, and carrier_3. At 514, a mean carrier link quality and standard deviation of the carrier link quality are determined.

At 516, a terminal type link quality is determined for each of the different terminal types. For example, a terminal type link quality would be determined for terminal type_1 which provides an indication of the quality of communication within the beam for terminal type_1 across all carriers. Similarly, a terminal type link quality would be determined for terminal type_2. At 518, a beam link quality is determined which provides an indication of system performance for all terminal types within the system. According to at least one embodiment, the beam link quality can be determined based, at least in part, on the values obtained for each of the different terminal type link qualities.

At 520, it is determined whether or not the system contains additional beams. For example, if the system contains 10 beams in total, control would pass to 522 where the next beam is selected. Control would then return to 512, where the procedure would then repeat for each beam until the remaining nine beams have been examined. Control can optionally return to 510 if additional data must be collected. According to one or more embodiments, data can be collected for all beams within the system simultaneously and the beam link quality can be determined in parallel for each of the different beams in the system. If no additional beams remain, then control passes to 524 where a system link quality is then determined. According to at least one embodiment, if the system contains multiple beams, the link quality for each beam can be combined in order to generate a system-level link quality that is representative of communication over all the different beams. If the system contains only a single beam, however, then the system link quality is equal to the beam link quality determined at 516.

At 526, it is determined whether the beam link quality or system link quality are within acceptable levels. According to various embodiments, different thresholds can be set for the beam link quality as well as the overall system link quality. If the values for either the current beam link qualities or the system link quality are below such thresholds (i.e., not okay), then control passes the 528. Various optimization routines can be performed to dynamically improve communication within the system. For example, if the beam link quality falls below 75% of the maximum achievable value, an optimization routine can be performed. The system link value, however, may be set for 70% of the maximum achievable value, thus allowing the beam level threshold to initiate optimization. The threshold values, therefore, can be set based on specific implementation and desired system performance. Depending on the specific value of the beam link quality and/or system link quality, multiple optimization routines can also be performed.

At 530, an alert is output in order to notify any system operator, for example, that the system performance has degraded below one or more of the preset thresholds. Furthermore, the alert can indicate the specific optimization routine, or routines, performed and whether or not improvements were achieved by performing such optimization routines. The process would then end at 532. Similarly, if it is determined at 526 that the values for the beam link quality and system quality are okay and within normal parameters, the process would also end.

Figure 6A:
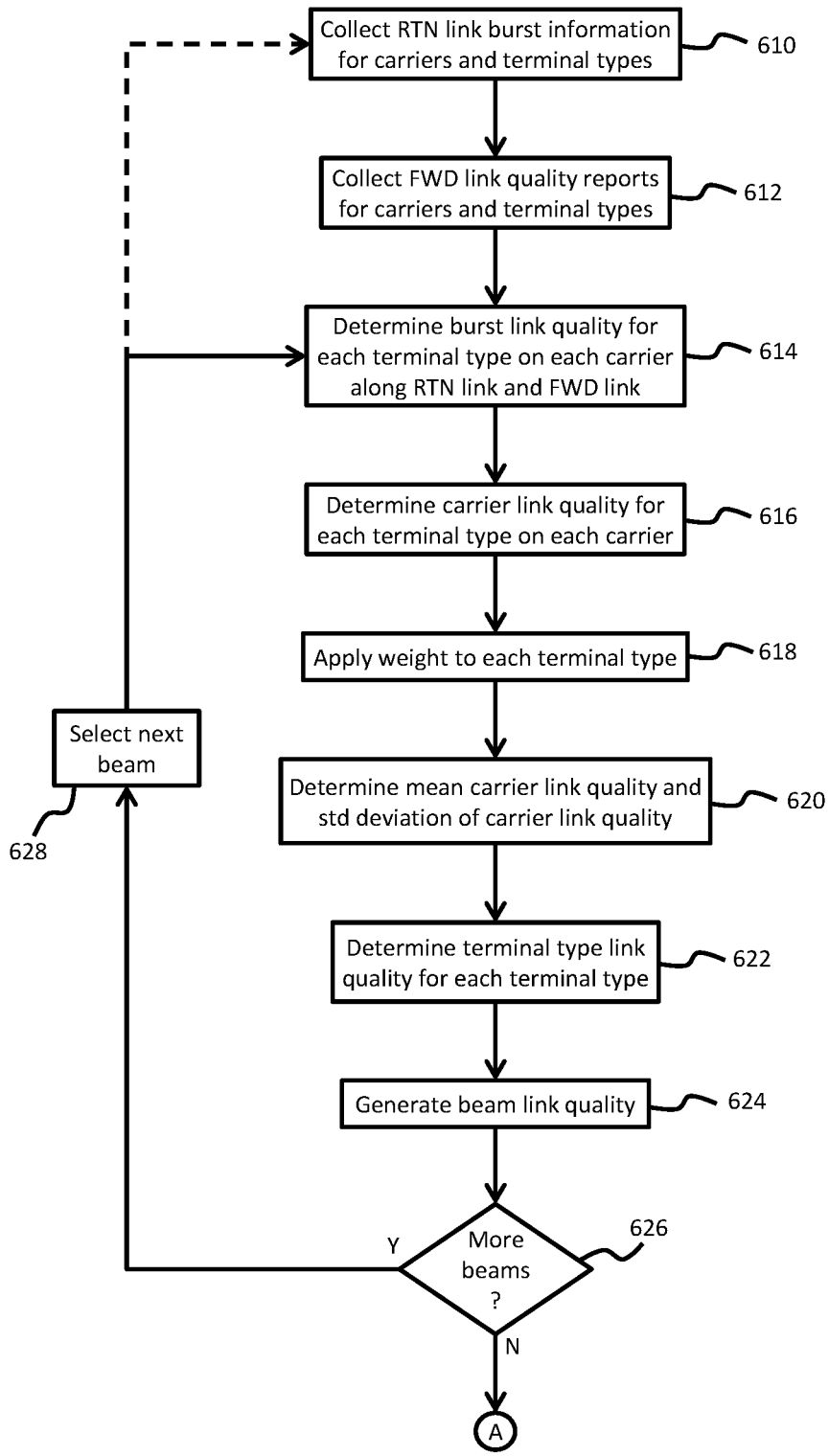
FIGS. 6A and 6B are a flowchart of a process for optimizing a system based on various link qualities, according to one or more embodiments.
Figure 6B:
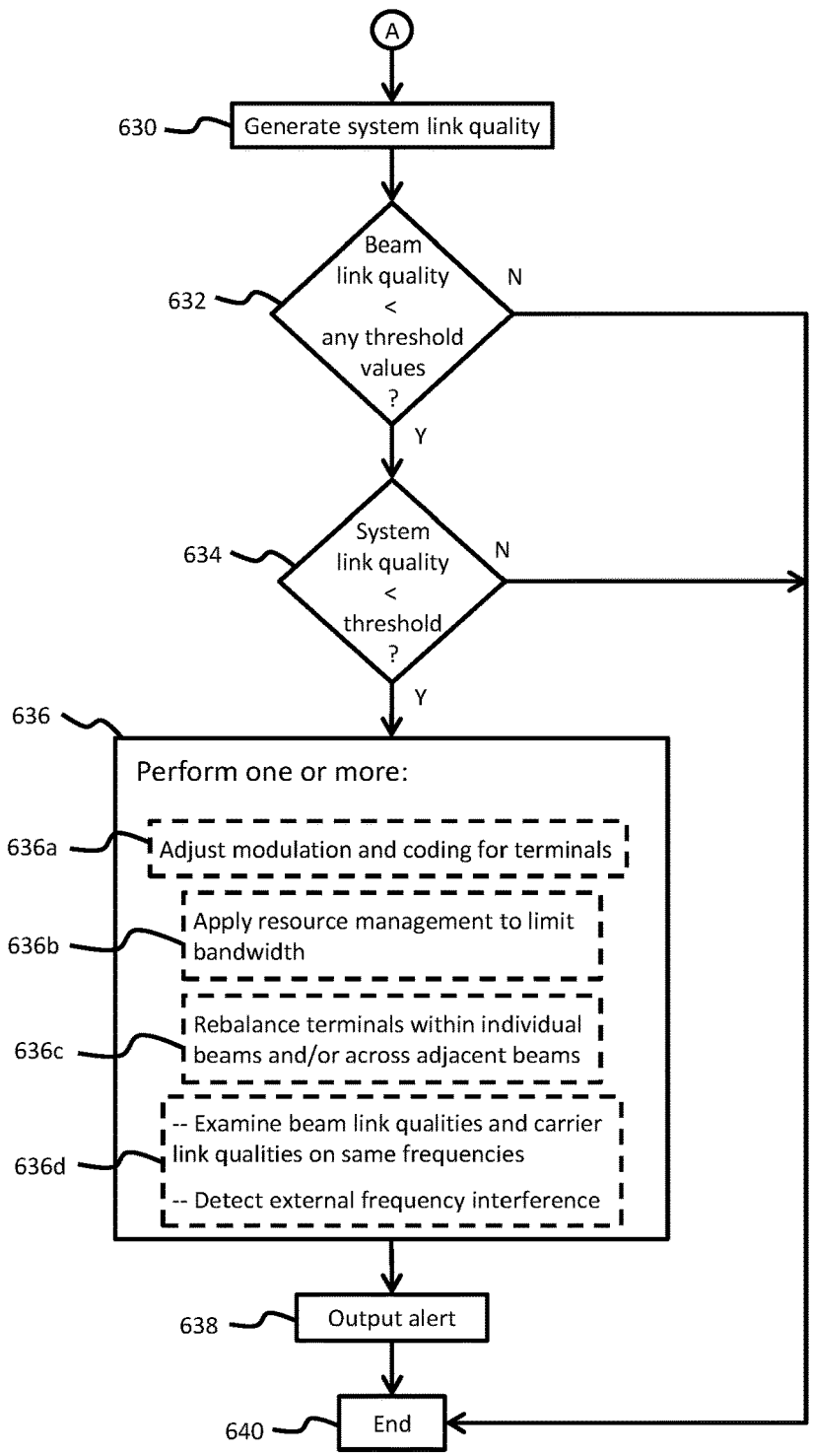

FIGS. 6A and 6B are a flowchart illustrating the steps performed in optimizing a system based on the various link qualities, in accordance with various embodiments. At 610, return link burst information is collected for all carriers and terminal types. According to one embodiment, a predetermined measurement can be set, and the number of bursts received from each terminal monitored in order to determine the burst link quality metric for each terminal type over each carrier. According to additional embodiments, the measurement period can be subdivided into smaller intervals. For example, the measurement period can be ten minutes, and the intervals can be 5 ms. At 612, a measurement period is set for collecting forward link quality reports from each terminal over the different carriers being used. For example, all forward link quality reports can be collected during the measurement period (e.g., fifteen minutes), and tabulated over smaller intervals (e.g., five seconds). Additionally, a cumulative summation can be maintained for all of the smaller intervals during the measurement period.

According to one or more embodiments, the return link burst information and the forward link quality reports can be simultaneously collected for overlapping periods of time. According to other embodiments, they may be collected over distinct measurement periods. At 614, a burst link quality is determined for each burst from a terminal type on each carrier along both the return link and the forward link. For example, the base station can determine the burst link quality on the return link based on various properties of the burst. Along the forward link, information contained in the forward link quality reports can be used to determine the link quality of each burst.

At 616, a carrier link quality is determined for each terminal type on each carrier. If the system includes three terminal types and five carriers, for example, then a carrier link quality would be determined for terminal type_1 over carrier_1, carrier_2, carrier_3, carrier_4, and carrier_5. A carrier link quality would also be determined for terminal type_2 over carrier_1, carrier_2, carrier_3, carrier_4, and carrier_5. Similarly, a carrier link quality would be determined for terminal type_3 over carrier_1, carrier_2, carrier_3, carrier_4, and carrier_5. At 618, a weight is determined and applied to each terminal type. The weight can represent, for example, the level of activity of one terminal type relative to another terminal type. Furthermore, the weight may be time-based and utilize multiple carriers in order to more accurately represent different terminal types over the measurement interval. According to such embodiments, the effect of the burst link qualities for different terminal types can be better evaluated for different carriers.

At 620, a mean carrier link quality and standard deviation of the carrier link quality are determined. According to at least one embodiment, the weight determined for each terminal type is utilized, in part, to determine the mean carrier link and the standard deviation of the carrier link quality. At 622, a terminal type link quality is determined for each terminal type in the system. Accordingly, a terminal type link quality would be determined for terminal type_1, terminal type_2, and terminal type_3. At 624, an overall beam link quality is determined based on the terminal type link qualities.

At 626, it is determined whether the system contains additional beams. If additional beams are present, then control passes to 628 where the next beam is selected. Control returns to 614 where the process is repeated for the next beam. Additionally, the process is repeated until a beam link quality has been determined for every beam within the system. A system containing ten beams, therefore, would cause the process to be performed ten times. According to one or more embodiments, the beam link quality for each beam can be determined in parallel over the same measurement period. Additionally, rather than returning to 614, various implementations can allow control for pass to 610 where additional information is collected from the return link verse and the forward link quality reports.

If no more beams are present, then a system link quality is determined at 630. The system link quality can be based, for example, on the individual beam link qualities if multiple beams are present in the system. If the system contains only a single beam, however, then the system link quality would be the same as the beam link quality. At 632, it is determined whether the beam link quality is below any predetermined threshold values. According to one or more embodiments, different threshold values can be set for the beam link quality so that different optimization routines can be applied based on the particular level of the beam link quality. If the beam link quality is above all of the preset thresholds, then control passes to 640. If the beam link quality is below any of the predetermined threshold values, however, control passes to 634. It is determined, at 634, whether the system link quality has fallen below another preset threshold. If the system link quality has not fallen below the preset threshold, then control can pass to 640. If the system link quality is below the threshold, however, control passes to 636. According to one or more embodiments, however control may still pass to 636 in conditions where the system link quality is above the threshold, but the beam link quality is below a critical threshold value.

At 636, one or more optimization routines are performed. According to one optimization, for example, a link adaptation routine can be performed in order adjust the modulation and coding scheme utilized for the terminals within the beam and/or the system in order to improve communication. A satellite communication system typically executes a link adaptation control algorithm independently for each terminal in the system. The beam link quality, terminal type link quality, and carrier link quality can be used in conjunction with the standard link adaptation algorithm at 636*a* in order to improve system performance. According to an embodiment, data for one or more terminal types can be processed over a period of time and a minimum value and maximum value can be determined for the beam link quality over this measurement period. Furthermore, the system can be configured such that the minimum and maximum values are only captured/latched as a minimum or maximum, if the value is sustained over a configurable amount of time. The minimum beam link quality can be compared to various predetermined thresholds to set a minimum modulation and coding scheme used in the beam (or carrier). Similarly, the maximum beam link quality value can be compared to configurable thresholds to set a maximum modulation and coding scheme used in the beam (or carrier).

According to one implementation, comparison of a minimum or maximum beam link quality to predetermined threshold values can occur as follows. A set of configurable thresholds can be assigned as T1, T2, . . . Tn, where each threshold corresponds, respectively, to modulation and coding schemes MCS1, MCS2, . . . , MCSn. Furthermore, T1 represents the highest threshold. The beam link quality is compared to each threshold starting with T1. Once the comparison of beam link quality >= threshold is true, the corresponding MCS is used. For example, the beam link quality would first be compared to T1. If the beam link quality is <T1, the next threshold (T2) is used for the comparison. If the beam link quality is >=T2, then the system would set the current coding and modulation scheme to MCS2, which corresponds to the T2 threshold. Alternatively, a single threshold value can be used for the beam link quality and/or the system link quality, and the coding and modulation can be adjusted if the values fall below the threshold.

According to another optimization, the beam link quality and/or system link quality can be used at 636b to apply resource management techniques for bandwidth control. For example, a degraded beam may be allowed to use as much bandwidth (e.g., 50%) as a good beam. Since the because quality is poor and higher coding/modulation can't be used, however, the total GBR possible in the degraded beam in that same bandwidth will be less. According to another example, the beam link quality can be assessed over a predetermined time interval and used to limit the maximum guaranteed bit rate (GBR) allowed for use by guaranteed bit rate services in a beam. Beams/carriers with better link quality would allow more GBR services (for the same bandwidth), than beams with degraded link quality.

For example, consider two beams with the same resources (carrier bandwidth) in each beam, and each beam providing 200 kbps throughput in ideal conditions where highest MCS is use. Beam_1 has consistently poor link quality such that higher modulation and coding schemes can't be used. Furthermore, Beam_1 is only capable of using a lower modulation and coding that supports only 150 kbps. Beam_2 has good quality where highest MCS can be used and thus the maximum ideal 200 kbps throughput is indeed possible. The system may not allow a terminal to set up 120 kbps service in Beam_1 with lesser link quality, because 120 kbps would leave less bandwidth for other flows. However, the system would allow the terminal to set up 120 kbps service in Beam_2.

According to another optimization routine, the terminals can be rebalanced at 636c. According to various embodiments, rebalancing can be performed within individual beans (based on micro beams within the beam) and/or across adjacent beans. For example, when a terminal accesses the network, the system examines different beams to determine which can service the terminal (geographically concurrent or neighbor beams). According to at least one embodiment, the beam link quality can be used to assign the terminal to operate in a beam with the most favorable link quality, thereby maximizing its performance/throughput. Beams and micro beams can be assigned different rankings (e.g., good, fair, poor, etc.) based on predetermined thresholds. Terminals can be assigned to beams and micro beams having the most favorable ranking. Furthermore, the carrier link quality can be examined in order to assign a terminal to operate on the carrier within a beam with the best link quality. Terminal rebalancing can be performed in conjunction with changes in the modulation and coding scheme in order to improve link quality. This can be particularly useful where various terminal types are mobile and currently moving with in different coverage beams are capable of accessing different beans and/or micro beams within the system.

According to another optimization, the beam link qualities and carrier link qualities for beams and carriers operating on the same frequencies can be examined at 636d. Due to frequency reuse conditions, such an examination can detect whether or not external frequency interference is causing any degradation in performance. More particularly, the system can examine the link quality of beams/carriers utilizing the same frequencies (frequency reuse condition). Such an examination can determine if one particular frequency range is experiencing the effects of a potential external interferer, which would be indicated by low link quality metric values on beams/carriers utilizing the same frequencies. The beam link qualities of different sets of beams using the same frequencies could be assessed for this purpose.

For example, Beam_1, Beam_2, and Beam_3 may utilize frequency range f1 to f2, and generate good beam link qualities. Similarly, Beam_4, Beam_5, and Beam_6 are utilizing frequency range f3 to f4, and showing good link quality. However, Beam_7, Beam_8, and Beam_9 are utilizing frequency range f5 to f6, and showing poor link quality. Such results may cause an alert for the beams showing poor link quality so that further steps can be taken by an administrator. One or more of these optimization routines can be applied on individual beans, micro beams, or multiple beams in order to improve the beam link quality and/or the system link quality.

At 638, an alert is output in order to notify an operator of degradation in system performance and the various steps that have been performed to compensate. Additionally, the alert can provide further indication as to improvements that have occurred as a result of the optimization. For example, the alert can identify potential external interferer problems that require immediate attention from an operator/administrator. The process then ends at 640.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. The terms software, computer software computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc.

As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for performing the described functions is detailed below.

Figure 7:
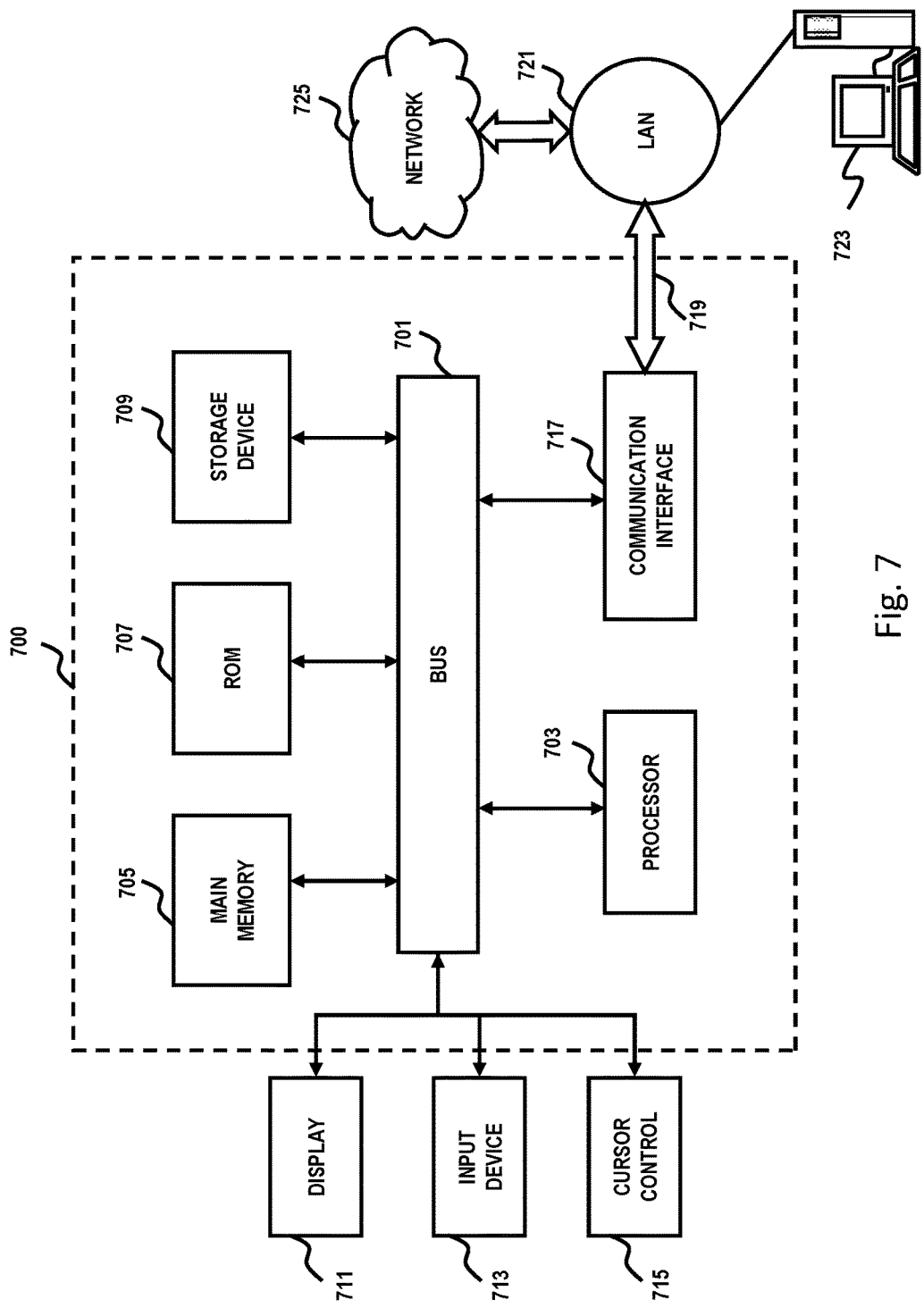
FIG. 7 is a diagram of a computer system that can be used to implement various exemplary embodiments.

FIG. 7 is a diagram of a computer system that can be used to implement various embodiments. The computer system 700 includes a bus 701 or other communication mechanism for communicating information and a processor 703 coupled to the bus 701 for processing information. The computer system 700 also includes main memory 705, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a light emitting diode (LED) or other flat panel displays, for displaying information to a user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711. Additionally, the display 711 can be touch enabled (i.e., capacitive or resistive) in order facilitate user input via touch or gestures.

According to an exemplary embodiment, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multiprocessing arrangement may also be employed to execute the instructions contained in main memory 705. In alternative embodiments, hard-wired circuitry may be used in place of or in combination with software instructions to implement exemplary embodiments. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a High Definition Multimedia Interface (HDMI), etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 such as a wide area network (WAN) or the Internet. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 1000 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Non-volatile media can further include flash drives, USB drives, microSD cards, etc. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 8:
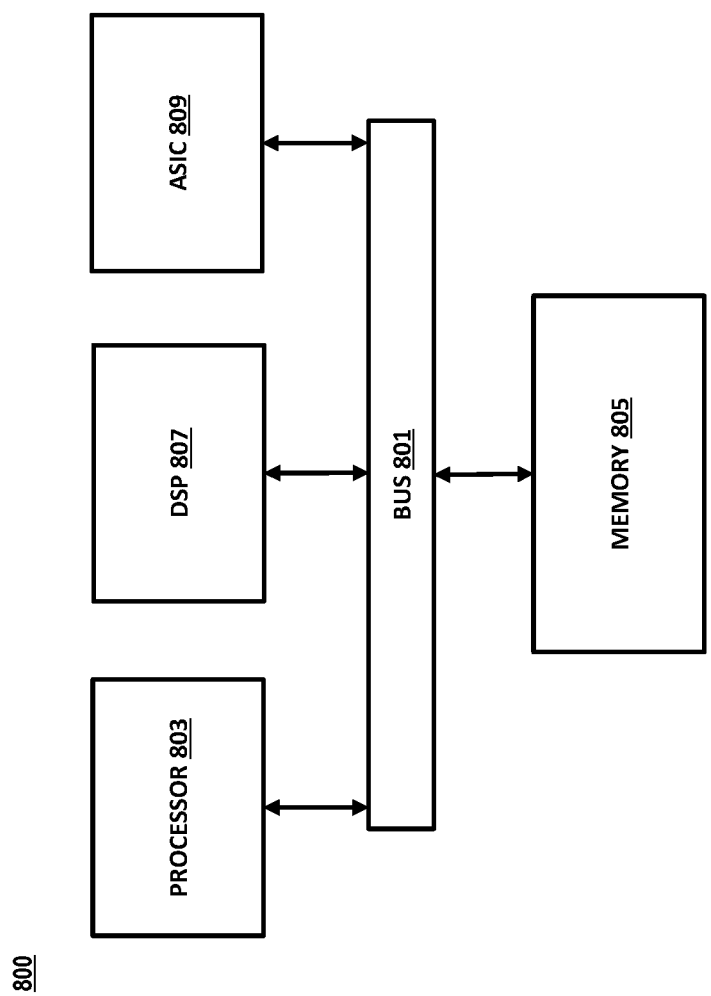
FIG. 8 is a diagram of a chip set that can be used to implement various exemplary embodiments.

FIG. 8 illustrates a chip set 800 upon which an embodiment of the invention may be implemented. Chip set 800 is programmed to implement various features as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of the figures.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   collecting data, for a predetermined interval, in a communication system having at least one beam and a plurality of carriers operable within each of the at least one beam;
   determining a carrier link quality for each terminal type on each of the plurality of carriers utilized in the communication system;
   determining a mean carrier link quality and standard deviation of the carrier link quality for each terminal type based, at least in part, on the determined carrier link qualities;
   determining a terminal type link quality for each terminal type on the plurality of carriers, based on the mean carrier link qualities and standard deviation of the carrier link qualities;
   generating a beam link quality for each of the at least one beam based, at least in part, on the terminal type link qualities; and
   performing at least one optimization routine responsive to the beam link quality.

2. The method of claim 1, further comprising:
   generating a system link quality by combining the beam link quality for all beams in the communication system; and
   performing at least one optimization routine responsive to the system link quality.

3. The method of claim 1, further comprising outputting an alert if the beam link quality falls below a predetermined threshold.

4. The method of claim 1, wherein collecting data further comprises:
   collecting return link information regarding total burst received for each terminal type; and
   collecting forward link quality reports from each terminal type on each of the plurality of carriers.

5. The method of claim 4, wherein determining a carrier link further comprises determining a burst link quality for each terminal type on each of the plurality of carriers based on the collected return link information and collected forward link quality reports.

6. The method of claim 4, further comprising applying a weight to each terminal type based, at least in part, on the collected return link information and collected forward link quality reports.

7. The method of claim 1, wherein performing at least one optimization routine comprises performing a load balancing of terminals in the communication system if the beam link quality falls below a predetermined threshold.

8. The method of claim 1, wherein performing at least one optimization routine comprises adjusting the coding and modulation scheme for terminals in the communication system based on at least one predetermined threshold value for the beam link quality.

9. The method of claim 8, further comprising limiting a total bit rate of all guaranteed bit rate services based on the lowest modulation and coding scheme supported by the beam link quality.

10. The method of claim 1, wherein performing at least one optimization routine comprises:
    examining at least one of the beam link quality and carrier link quality of beams and/or carriers utilizing the same frequencies; and
    outputting an alert if the examined beam link qualities and/or carrier link qualities are below a minimum threshold,
    wherein the minimum threshold is indicative of external frequency interference.

11. A system comprising:
    a plurality of terminal of predetermined types for communicating over a communication system having at least one beam and a plurality of carriers operable within each of the at least one beams; and
    at least one base station configured to communicate with the plurality of terminal types, and to monitor and control one or more operations within the communication system,
    the at least one base station being further configured to:
    collect data, for a predetermined interval,
    determine a carrier link quality for each terminal type on each of the plurality of carriers utilized in the communication system,
    determine a mean carrier link quality and standard deviation of the carrier link quality for each terminal type based, at least in part, on the determined carrier link qualities,
    determine a terminal type link quality for each terminal type on the plurality of carriers, based on the mean carrier link qualities and standard deviation of the carrier link qualities,
    generate a beam link quality for each of the at least one beam based, at least in part, on the terminal type link qualities; and
    perform at least one optimization routine responsive to the beam link quality.

12. The system of claim 11, wherein the base station is further configured to:
    generate a system link quality by combining the beam link quality for all beams in the communication system; and perform at least one optimization routine responsive to the system link quality.

13. The system of claim 11, wherein the base station is further configured to output an alert if the beam link quality falls below a predetermined threshold.

14. The system of claim 11, wherein the base station is configured to collect data by:
   collecting return link information regarding total burst received for each terminal type; and
   collecting forward link quality reports from each terminal type on each of the plurality of carriers.

15. The system of claim 14, wherein the base station is configured to determine a carrier link by determining a burst link quality for each terminal type on each of the plurality of carriers based on the collected return link information and collected forward link quality reports.

16. The system of claim 14, wherein the base station is further configured to apply a weight to each terminal type based, at least in part, on the collected return link information and collected forward link quality reports.

17. The system of claim 11, wherein the base station is configured to perform at least one optimization by performing a load balancing of terminals in the communication system if the beam link quality falls below a predetermined threshold.

18. The system of claim 11, wherein the base station is configured to perform at least one optimization by adjusting the coding and modulation scheme for terminals in the communication system based on at least one predetermined threshold value for the beam link quality.

19. The system of claim 18, wherein the base station is further configured to limit a total bit rate of all guaranteed bit rate services based on the lowest modulation and coding scheme supported by the beam link quality.

20. The system of claim 11, wherein the base station is configured to perform at least one optimization by:
   examining at least one of the beam link quality and carrier link quality of beams and/or carriers utilizing the same frequencies; and
   outputting an alert if the examined beam link qualities and/or carrier link qualities are below a minimum threshold,
   wherein the minimum threshold is indicative of external frequency interference.

* * * * *